United States Patent
Gibson et al.

(10) Patent No.: US 10,408,265 B2
(45) Date of Patent: Sep. 10, 2019

(54) BEARING SHELL

(71) Applicants: Mahle International GmbH, Stuttgart (DE); Mahle Engine Systems UK Ltd, Rugby (GB); Mahle Industries, Incorporated, Morristown, TN (US)

(72) Inventors: Hugh Gibson, Knoxville, TN (US); Omar Mian, Warwickshire (GB); Konstantinos Kalogiannis, Warwickshire (GB); David Merritt, Warwickshire (GB)

(73) Assignees: Mahle International GmbH (DE); Mahle Engine Systems UK Ltd (GB)

(*) Notice: Subject to any disclaimer, the term of this patent is extended or adjusted under 35 U.S.C. 154(b) by 0 days.

(21) Appl. No.: 14/917,535

(22) PCT Filed: Sep. 9, 2014

(86) PCT No.: PCT/EP2014/069195
§ 371 (c)(1),
(2) Date: Mar. 8, 2016

(87) PCT Pub. No.: WO2015/032980
PCT Pub. Date: Mar. 12, 2015

(65) Prior Publication Data
US 2016/0223020 A1   Aug. 4, 2016

(30) Foreign Application Priority Data
Sep. 9, 2013 (GB) .................................. 1315974.4

(51) Int. Cl.
*F16C 17/02* (2006.01)
*F16C 33/10* (2006.01)
(Continued)

(52) U.S. Cl.
CPC ............ *F16C 33/1065* (2013.01); *F16C 9/02* (2013.01); *F16C 17/022* (2013.01); *F16C 33/046* (2013.01); *F16C 2240/42* (2013.01)

(58) Field of Classification Search
CPC ............... F16C 33/106; F16C 33/1065; F16C 33/1085; F16C 9/02; F16C 17/022;
(Continued)

(56) References Cited

U.S. PATENT DOCUMENTS 2,901,297 A * 8/1959 Sternlicht ............. F16C 17/028
384/291
4,105,267 A * 8/1978 Mori ................... F16C 33/1065
384/291

(Continued)

FOREIGN PATENT DOCUMENTS

CN         101523067 A         9/2009
DE     102012210530 A1 * 12/2013 ................ F16C 9/04
(Continued)

OTHER PUBLICATIONS

Machine Translation of DE 102012210530 dated Dec. 2013.*
(Continued)

*Primary Examiner* — Alan B Waits
(74) *Attorney, Agent, or Firm* — Fishman Stewart PLLC

(57) ABSTRACT

An engine bearing shell may include a concave bearing surface, opposed axial end faces with an axial width therebetween, circumferential joint faces, and an oil distribution groove circumferentially extending along the concave bearing surface towards the axial end faces. The oil distribution groove may have a groove width that is 4% to 9.25% of the axial width.

14 Claims, 3 Drawing Sheets

(51) Int. Cl.
*F16C 9/02* (2006.01)
*F16C 33/04* (2006.01)

(58) Field of Classification Search
CPC .. F16C 2240/42; F16C 33/122; F16C 33/125; F16C 33/127; F16C 33/124; F16C 33/046
See application file for complete search history.

(56) References Cited

U.S. PATENT DOCUMENTS

| | | | |
|---|---|---|---|
| 6,868,810 B2* | 3/2005 | Hojo | F02B 61/02 123/54.4 |
| 7,234,870 B2* | 6/2007 | Kitahara | F16C 9/02 384/288 |
| 8,317,401 B2 | 11/2012 | Matsuyama | |
| 8,608,385 B2* | 12/2013 | Ovares | F16C 9/02 384/283 |
| 8,696,209 B2* | 4/2014 | Ishigo | F16C 9/04 384/288 |
| 8,783,954 B2* | 7/2014 | Garnier | F16C 9/02 384/286 |
| 8,905,639 B2* | 12/2014 | Ishigo | F16C 9/02 384/288 |
| 8,979,379 B1* | 3/2015 | Kawashima | F16C 9/02 384/288 |
| 9,046,124 B2* | 6/2015 | Beaurepaire | F16C 3/14 |
| 2005/0135716 A1 | 6/2005 | Welch et al. | |
| 2005/0196084 A1 | 9/2005 | Kitahara et al. | |
| 2008/0112658 A1 | 5/2008 | Justin | |
| 2011/0317955 A1* | 12/2011 | Mayston | C08L 79/08 384/625 |
| 2012/0294558 A1 | 11/2012 | Ovares et al. | |
| 2013/0343682 A1* | 12/2013 | Garnier | F16C 9/02 384/322 |
| 2014/0003750 A1* | 1/2014 | Lehmann | F16O 9/02 384/322 |

FOREIGN PATENT DOCUMENTS

| | | |
|---|---|---|
| EP | 2 078 875 A1 | 7/2009 |
| EP | 2604873 A1 | 6/2013 |
| FR | 2668217 A1 | 4/1992 |
| GB | 824204 A | 11/1959 |
| GB | 2465852 A | 6/2010 |
| GB | 2485807 A | 5/2012 |
| JP | H11201167 A | 7/1999 |
| JP | 2005-273715 A | 10/2005 |
| JP | 2005-534871 A | 11/2005 |
| JP | 2012-511128 A | 5/2012 |
| JP | 2014503759 A | 2/2014 |
| JP | 2014-513784 A | 6/2014 |
| WO | WO-2004/007809 A2 | 1/2004 |
| WO | WO-2010066396 A1 | 6/2010 |
| WO | WO-2012/069191 A1 | 5/2012 |
| WO | 2012123213 A1 | 9/2012 |

OTHER PUBLICATIONS

English abstract for FR-2668217.
English abstract for JP-11201167.
Chinese Office Action for CN 201480048709.7 dated Jan. 17, 2018.
Japanese Office Action 2016-539584 dated Jul. 31, 2018.
English Abstract for JP 2005-273715(A).
English Abstract for JP2014-513784(A).
Japanese Notice of Allowance dated Dec. 11, 2018 in relation to corresponding Japanese Patent Application No. 2016-539584.
Chinese Office Action dated Nov. 30, 2018 for corresponding Chinese Patent Application No. 201480048709.7.
English Abstract for CN-101523067-A.

* cited by examiner

BEARING SHELL

CROSS-REFERENCE TO RELATED APPLICATIONS

This application claims priority to British Patent Application No. 1315974.4, filed Sep. 9, 2013, and International Patent Application No. PCT/EP2014/069195, filed Sep. 9, 2014, both of which are hereby incorporated by reference in their entirety.

TECHNICAL FIELD

The present invention relates to bearing shells for sliding bearings, and in particular to bearing shells for engine crankshaft bearings.

BACKGROUND

In typical internal combustion engines, pairs of hollow semi-cylindrical bearing lining shells (also known as "half bearings") are used to allow rotation of the crankshaft at both connecting rod bearing assemblies and main bearing assemblies.

Connecting rod bearing assemblies are provided at the "big end" of a connecting rod, where it connects onto a crankshaft pin. The bearing shell in the connecting rod bearing assembly that is closest to the piston is known as the "loaded" bearing shell, as it bears higher peak loads than the complementary "unloaded" bearing shell, due to experiencing the combustion load from firing the corresponding piston. Main bearing assemblies are provided where the engine block and engine cap form a housing to support the main (axial) crankshaft journal. In contrast to the connecting rod assembly, in the main bearing assembly, it is the bearing shell that is furthest from the piston that is known as the "loaded" bearing shell and which bears higher peak loads that the complementary "unloaded" bearing shell, also due to experiencing the combustion load from firing the corresponding piston cylinder.

The bearing surfaces of bearing shells generally have a layered construction, in which a strong backing material is coated with one or more layers having preferred tribological properties to provide a bearing surface that faces the cooperating moving part (i.e. a crankshaft journal), in use. Known bearing shells comprise: a backing, lined with a lining layer, and optionally an overlay layer. The strong backing material may be steel, having a thickness of about 1 mm or more. A lining layer is provided on the backing, for example, a copper-based material (e.g. copper-tin bronze) or an aluminium-based material (e.g. aluminium or aluminium-tin alloy), which is adhered to the backing. The thickness of the lining layer is generally in the range from about 0.05 to 0.5 mm or 0.1 to 0.5 mm (e.g. 300 µm of copper-based alloy of 8% wt Sn, 1% wt Ni, and balance of Cu, apart from incidentally impurities). The bearing surface is optionally coated with a layer (the "overlay layer") of 6 to 25 µm of a plastic polymer-based composite layer or a metal alloy layer (e.g. a tin-based alloy overlay). For example, WO2010066396 describes a plastic polymer-based composite material for use as an overlay layer, and WO2004007809 discloses a known tin-based overlay.

Lubricating oil is distributed from an oil gallery running through the engine block or engine cap to the main bearing assemblies, with oil supply channels supplying the oil to the bearing clearance through radial oil supply holes in the bearing shells. Channels (known as "drillings") running through the crankshaft then redistribute oil from the bearing clearances of the main bearing assemblies to the bearing clearances of the connecting rod bearing assemblies. In normal operation, the crankshaft journal and bearing shell are spaced apart by a wedge-shaped cushion-like oil film that is drawn between them, under a condition known as "hydrodynamic lubrication".

The bearing shell can become damaged by operating under excessively high peak loads, causing mechanical fatigue, which is commonly referred to as "overloading" the bearing assembly.

High peak loads in bearing assemblies result in correspondingly high, localised peak oil pressures and oil temperatures between the crankshaft journal and the bearing shells. Despite the addition of sophisticated oil additives, when the bearing assembly runs under high temperature operating conditions, the dynamic viscosity of the lubricating oil may greatly reduce, producing a thinner oil film. High peak loads and the low dynamic oil viscosity arising from high oil temperatures increase the incidences of direct physical contact between the crankshaft journal and bearing shell through failure of the intervening oil film, leading to increased rates of abrasion of the bearing shell, in use.

High temperature operation of the bearing shells also causes thermal degradation of the bearing shells, for example by enhancing the migration of minority species to metal-alloy grain boundaries (e.g. migration of tin to grain boundaries in an aluminium-tin lining layer), which weakens the layer. Further, high temperature operation can cause metal species to migrate between layers (e.g. to diffuse out of the overlay and/or lining layer). Yet further, high temperature operation causes thermal degradation of the lubricating oil, necessitating more frequent lubricating oil changes.

In conventional crankshaft main bearing assemblies, oil is fed into the bearing clearance between the crankshaft journal and the bearing shells through a radial oil supply hole in the unloaded bearing shell, which receives high pressure lubricating oil by an arrangement of channels through the engine.

In the case of main bearing assemblies, it is known to provide a wide circumferential oil distribution groove along the middle of the bearing surface (the concave inner surface) of the unloaded bearing shells, to supply oil to a connecting rod bearing assembly through a corresponding crankshaft drilling. The oil groove is used to increase the period of each crankshaft rotation during which oil is supplied from the wide circumferential groove, through a hole in the main journal, and through the crankshaft internal drillings, to the connecting rod bearing assemblies. A wide circumferential groove is required to ensure that oil is provided to the entire crankshaft bearing assembly at high pressure. Motivated by maximising the surface area across which the peak load is distributed, a grooved bearing is not used as a lower main bearing shell. An unloaded main bearing shell having a wide circumferential oil distribution groove is illustrated in WO2012069191.

In conventional crankshaft connecting rod bearing assemblies, oil is fed into the bearing clearance between the crankshaft journal and the bearing shells through a radial oil supply hole in the unloaded bearing shell, which receives high pressure lubricating oil from main bearing clearance, through the crankshaft drillings.

Connecting rod bearing assemblies may be subjected to higher peak loads than the main bearing assemblies, and may operate particularly close to their performance limit. Conventionally, to minimise the peak pressures in connecting rod bearing assemblies, neither the loaded nor unloaded connecting rod bearing shells are provided with oil distribution grooves, in order to maximise the surface area across which the loads are spread.

SUMMARY

According to a first aspect, there is provided an engine bearing shell having a concave bearing surface, opposed axial end faces and circumferential joint faces, and an axial width between the axial end faces, and an oil distribution groove circumferential extending along the bearing surface towards the axial end faces and having a groove width that is 4 to 9.25% of the axial width of the bearing shell.

According to a second aspect, there is provided an engine comprising a bearing assembly having an engine bearing shell according to the first aspect.

According to a third aspect, there is provided an engine 10 comprising main bearing assemblies 12a and connecting rod bearing assemblies 12b, each bearing assembly 12a, 12b having a loaded bearing shell 14a, 14b configured to bear the combustion load from a respective piston and a complementary unloaded bearing shell, wherein the loaded bearing shells 14b of the connecting rod bearing assemblies 12b are bearing shells according to the first aspect, as shown in FIG. 4.

According to a fourth aspect, there is provided an engine 10 comprising main bearing assemblies 12a and connecting rod bearing assemblies 12b, each bearing assembly 12a, 12b having a loaded bearing shell 14a, 14b configured to bear the combustion load from a respective piston and a complementary unloaded bearing shell, wherein the loaded bearing shells 14a of the main bearing assemblies 12a are bearing shells according to the first aspect, as shown in FIG. 4.

The groove may have an axial width of 4 to 6% of the axial width of the bearing shell.

The circumferential oil distribution groove may extend fully or partially around the bearing surface between the joint faces.

The circumferential oil distribution groove may extend partially around the bearing surface between the joint faces, and the ends of the oil distribution groove may be spaced apart from the joint faces.

The circumferential oil distribution groove may be within the axially central third of the bearing surface of the bearing shell.

The circumferential oil distribution groove may be equidistant between the axial end faces.

The bearing shell may comprise part of a crankshaft-connecting rod bearing assembly.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals throughout.

Figure 1A:
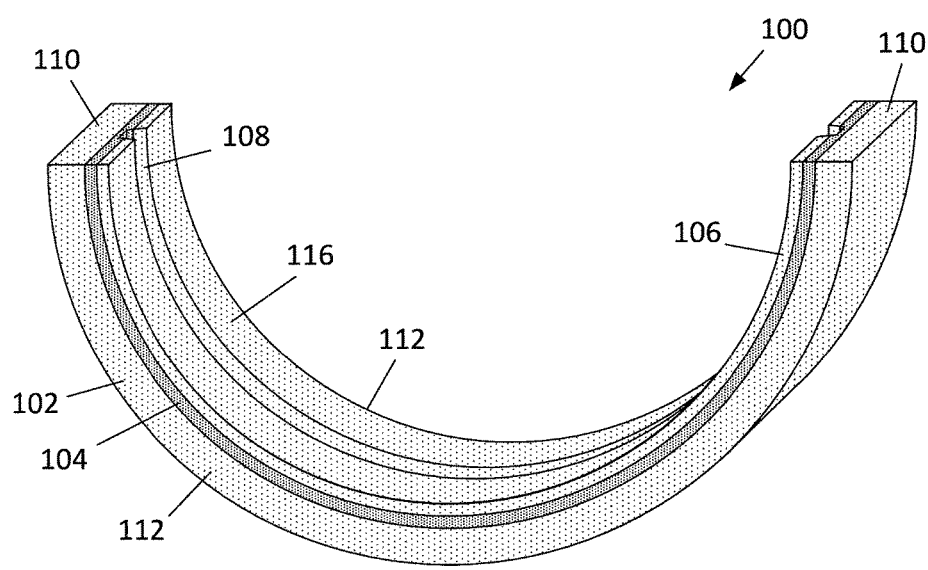
FIG. 1A shows a perspective view of an engine bearing shell.

FIG. 1A schematically illustrates a bearing shell 100 (e.g. a connecting rod bearing shell) in the form of a hollow semi-cylindrical bearing lining shell, which is commonly referred to as a "half bearing".

The bearing shell 100 has a substrate comprising a strong steel backing 102 and a bearing lining layer 104 (e.g. an aluminium-tin alloy layer) on the concave inner surface of the backing. An optional "overlay" layer 106 (e.g. a plastic polymer-based composite layer of a plastic polymer matrix with particulate distributed throughout the matrix) is provided on the substrate. The overlay layer 106 is configured to provide a running surface over the lifetime of the bearing shell 100. The overlay layer 106 is the innermost layer of the bearing shell 100, which is configured to face a cooperating moving part in a bearing assembly (e.g. the overlay layer receives a journaled crankshaft in an assembled bearing, which mutually cooperate, with an intervening film of lubricating oil).

Figure 3:
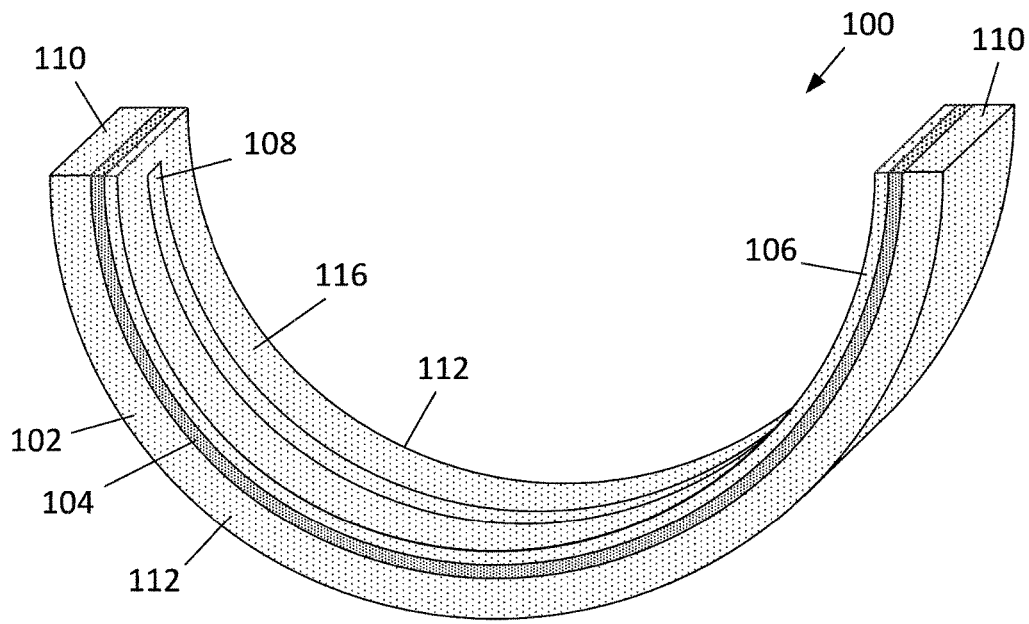
FIG. 3 shows a perspective view of a connecting rod bearing shell according to another exemplary approach.
Figure 4:
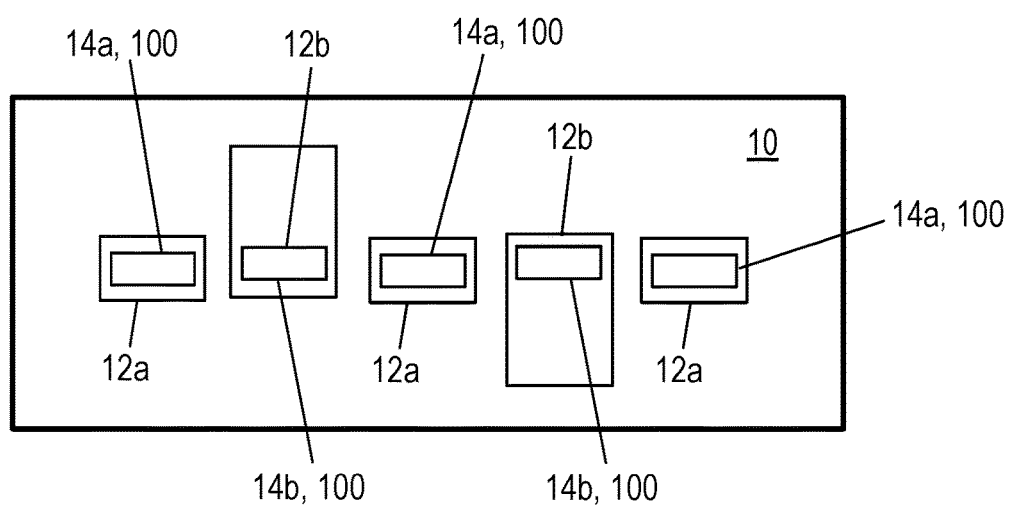
FIG. 4 shows a schematic view of an engine.

The bearing shell 100 is provided with a narrow oil distribution groove 108 extending circumferentially along the bearing surface 116 towards the joint faces 110, parallel with the axial end faces 112. The oil distribution groove 108 is centrally located between the axial end faces 112 (e.g. or at least, spaced apart from the end faces in the axially central third of the bearing shell as illustrated in FIG. 3). In use, the bearing shell 100 having the narrow oil distribution groove 108 is used as the loaded bearing shell in the bearing assembly of an engine. For example, in the case of connecting rod bearing assemblies, oil is supplied to the connecting rod bearing assemblies from the main bearing assemblies through channels (crankshaft drillings) in the crankshaft. The oil distribution groove 108 in the connecting rod bearing shell 100 is optionally provided with an oil hole (not shown), that extends radially through the bearing shell, and through which oil passes out to an oil supply channel (connecting rod drilling) in the connecting rod, to feed a bearing bush at the opposite end of the connecting rod (the "small end"), where the connecting rod connects onto a piston pin.

Figure 1B:
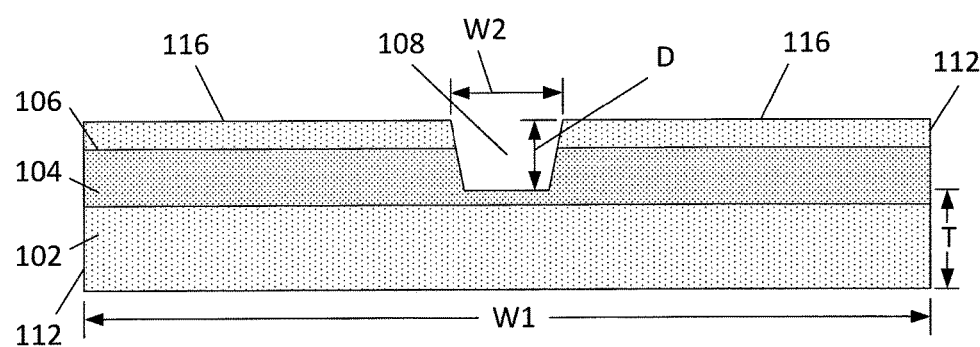
FIG. 1B shows a cross-sectional view of the engine bearing shell of FIG. 1A.

FIG. 1B shows an axial, cross-sectional view through the bearing shell 100. The bearing shell has parallel, axial ends 112, perpendicular to the axis of rotation of a cooperating journal, with an axial width W1. The circumferential groove 108 is recessed into the bearing surface 116 that faces a cooperating rotating crankshaft journal, in use, with an intervening bearing clearance containing lubricating oil. The groove 108 has an axial width W2, adjacent the bearing surface 116. The groove may be straight-sided or may reduce in width away from the bearing surface 116, as illustrated. The groove width W2 is specified at the bearing surface 116, where the lubrication oil within the circumferential oil groove 108 contacts the crankshaft, in use. At the bearing surface 116, the groove 108 has a width W2 that is 4 to 9.25% of the axial width W1 of the bearing shell 100, and preferably 4 to 6%.

The provision of a circumferential oil distribution groove 108 in the bearing surface 116 of a loaded connecting rod bearing shell enables the oil to be supplied directly to the loaded bearing shell, where more of the heat is generated, and to be more evenly distributed around the loaded bearing shell, compared with the conventional supply through a supply hole in the unloaded bearing shell.

Figure 2:
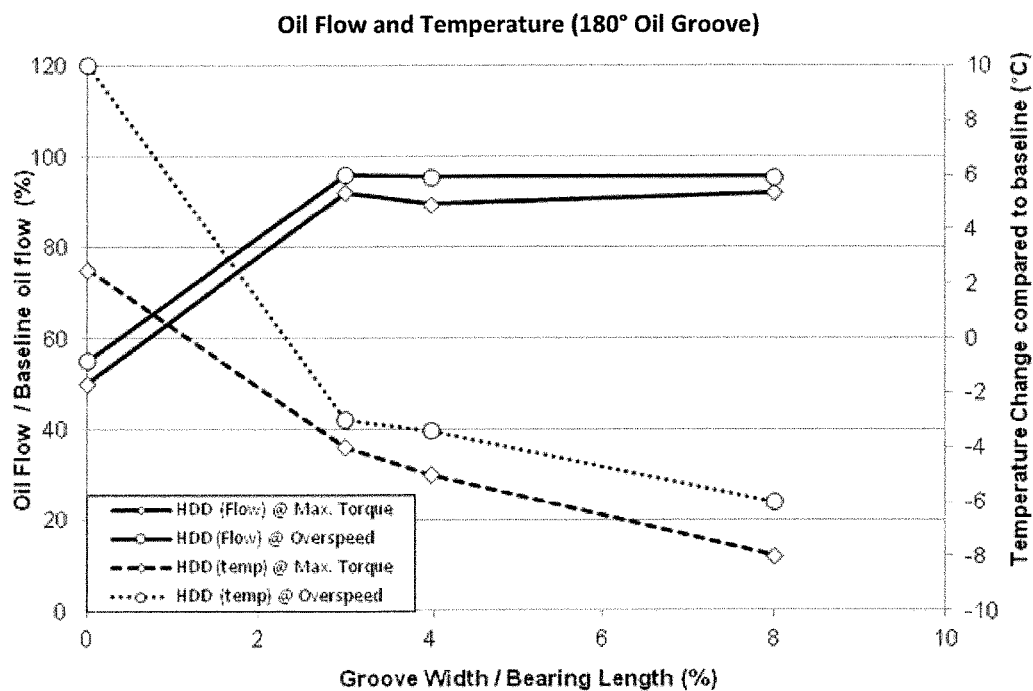
FIG. 2 shows a graph of the oil flow rate and oil operating temperature for different widths of circumferential groove.

Further, in the case of the same bearing clearance, the circumferential oil groove enables an enhanced flow rate of the lubricating oil supplied to the bearing assembly, for a fixed bearing clearance and fixed pumping conditions, as shown in FIG. 2, in which case the greater rate of oil flow would provide further enhanced thermal dissipation. Alternatively, the connecting rod bearing assembly may maintain the flow rate of the lubricating oil supplied to the bearing assembly by use of a reduced bearing clearance, between the crankshaft journal and the bearing shell.

Accordingly, the provision of the circumferential oil distribution groove enables the lubricating oil to provide superior cooling of the bearing shell, resulting in lower temperature operation of the corresponding bearing assembly, which is several degrees cooler than without the circumferential groove, as is also shown in FIG. 2. At high temperature operating conditions, the rate of thermal degradation of the bearing shell materials and the lubricating oil is particularly sensitive to the operating temperature, and decreases rapidly with any decrease in that operating temperature. Accordingly, the reduction in the operating temperature of a connecting rod bearing assembly under high performance operating conditions by several degrees substantially increases the durability of the bearing shell, as well as increasing the lifespans of both the bearing shell and the lubricating oil.

In high speed operation, the crankshaft journal and bearing shell are spaced apart by a wedge-shaped cushion of oil that is drawn between them, under a condition known as "hydrodynamic lubrication". The reduction of the operating temperature leads to the oil having a greater dynamic viscosity, thereby producing a greater oil film thickness between the bearing shell and crankshaft journal. The greater oil film thickness reduces the incidence of direct contact between the bearing shell and the crankshaft journal, and the corresponding abrasive wear.

For a circumferential groove having a width of no more than 9.25% of the bearing shell width, and particularly no more than 6%, the reduction in load bearing area of the bearing shell is compensated for by the reduced wear rate of the bearing shell through the use of a thicker oil film and the reduced thermal degradation of the bearing shell and lubrication oil due to the lower operating temperature of the bearing shell. However, above this range, the reduction in the surface area of the bearing surface may result in an increased operating temperature and a reduction in the oil film thickness that leads to enhanced incidences of abrasive physical contact and enhanced thermal degradation of both the bearing shell and the lubricating oil.

Accordingly, between the conflicting demands upon the bearing design, the range of circumferential oil distribution grooves having widths of 4 to 9.25% of the axial width of the bearing shell offer enhanced bearing shell durability. Performance in the range of 4 to 6% can be particularly enhanced, as the abrasive wear of the bearing shell by physical contact between the bearing shell and journal is lowest in this range.

In exemplary bearing shells having axial widths W1 of 16.3 and 48 mm, circumferential oil distribution grooves are provided having widths W2 of 0.7 and 2.0 mm respectively, the sides of the grooves slope at 75° to the bearing surface, the groove depth across the bottom of the groove is approximately 0.5 mm, and the thickness (radially) of the bearing at the bottom of the groove is at least 0.5 mm.

Bearing shells are thin (in the radial direction), and subject to high loads. Accordingly, the circumferential oil groove is shallow, to maintain the strength of the bearing shell across the bottom of groove.

The axial sides of the circumferential groove are steeply sloping (e.g. at least 45° relative to the bearing surface).

In the illustrated embodiment, the circumferential groove extends all the way around the (inner) bearing surface of the bearing shell, between the joint faces. Alternatively, the circumferential groove may extend only part way around the bearing surface, for example stopping short of the joint faces by 30 to 60°. Or, the bearing shell may have portions of circumferential groove only adjacent the joint faces, for coupling with the ends of a full-length circumferential groove in a further bearing shell with which it is mated in a complete bearing assembly.

A partial circumferential groove may provide greater performance enhancement than a full-length circumferential groove, as it enables the enhanced oil flow to be better targeted to regions of the bearing shell that experience higher peak loads.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An engine bearing shell comprising:
   a steel backing having a concave bearing surface,
   a bearing lining layer on the concave bearing surface,
   opposed axial end faces with an axial width therebetween,
   circumferential joint faces, and
   an oil distribution groove circumferentially extending along the concave bearing surface towards the axial end faces and having a groove width that is 4% to 9.25% of the axial width;
   wherein the oil distribution groove extends partially around the concave bearing surface between the circumferential joint faces, and ends of the oil distribution groove are spaced apart from the circumferential joint faces at an angle between 40 degrees and 60 degrees; and
   wherein sides of the oil distribution groove have a constant slope between 75 degrees and 90 degrees.

2. An engine bearing shell according to claim 1, wherein the oil distribution groove has a groove width of 4% to 6% of the axial width.

3. An engine bearing shell according to claim 1, wherein the oil distribution groove is within an axially central third of the concave bearing surface.

4. An engine bearing shell according to claim 3, wherein the oil distribution groove is equidistant between the axial end faces.

5. An engine bearing shell according to claim 1, wherein the oil distribution groove extends partially into the bearing lining layer in a radial direction.

6. An engine bearing shell according to claim 1, further comprising an overlay layer provided on the bearing lining layer.

7. An engine bearing shell according to claim 6, wherein at least one of:
the bearing lining layer is an aluminium-tin alloy layer; and
the overlay layer is a plastic polymer-based composite layer of a plastic polymer matrix with particulate distributed throughout the matrix.

8. An engine bearing shell according to claim 1, wherein the ends of the oil distribution groove are equally spaced apart from the circumferential joint faces.

9. An engine bearing shell according to claim 8, wherein the angle is between 45 degrees and 60 degrees.

10. An engine comprising a bearing assembly having an engine bearing shell including:
a steel backing having a concave bearing surface,
a bearing lining layer on the concave bearing surface,
opposed axial end faces with an axial width therebetween,
circumferential joint faces, and
an oil distribution groove circumferentially extending along the concave bearing surface towards the axial end faces and having a groove width that is 4% to 9.25% of the axial width;
wherein the oil distribution groove extends partially around the concave bearing surface between the circumferential joint faces, and ends of the oil distribution groove are spaced apart from the circumferential joint faces at an angle between 40 degrees and 60 degrees; and
wherein sides of the oil distribution groove have a constant slope between 75 degrees and 90 degrees.

11. An engine according to claim 10, wherein the oil distribution groove of the bearing shell is within an axially central third of the concave bearing surface.

12. An engine according to claim 11, wherein the oil distribution groove of the bearing shell is equidistant between the axial end faces.

13. An engine comprising main bearing assemblies and connecting rod bearing assemblies, each bearing assembly having a loaded bearing shell configured to bear the combustion load from a respective piston and a complementary unloaded bearing shell,
wherein at least one of the loaded bearing shells of the connecting rod bearing assemblies and the loaded bearing shells of the main bearing assemblies includes:
a steel backing having a concave bearing surface,
a bearing lining layer on the concave bearing surface,
opposed axial end faces with an axial width therebetween,
circumferential joint faces, and
an oil distribution groove circumferentially extending along the concave bearing surface towards the axial end faces and having a groove width that is 4% to less than 5% of the axial width;
wherein the oil distribution groove extends partially around the concave bearing surface between the circumferential joint faces, and ends of the oil distribution groove are equally spaced apart from the circumferential joint faces at an angle between 40 degrees and 60 degrees; and
wherein sides of the oil distribution groove have a constant slope between 75 degrees and 90 degrees.

14. An engine according to claim 13, wherein the oil distribution groove of the bearing shell is within an axially central third of the concave bearing surface.

* * * * *